(12) United States Patent  (10) Patent No.:  US 7,006,726 B2
Hayes  (45) Date of Patent:  Feb. 28, 2006

(54) METHOD AND APPARATUS FOR OPTICAL DIVISION OF A BROADBAND SIGNAL INTO A PLURALITY OF SUB-BAND CHANNELS

(75) Inventor: Robert R. Hayes, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 241 days.

(21) Appl. No.: 10/719,941

(22) Filed: Nov. 21, 2003

(65) Prior Publication Data

US 2005/0111789 A1    May 26, 2005

(51) Int. Cl.
*G02B 6/26*  (2006.01)
*H04B 10/04*  (2006.01)

(52) U.S. Cl. .............................. 385/27; 385/1; 385/39; 398/183; 398/201

(58) Field of Classification Search ................ 385/1–3, 385/15, 27, 39; 398/182, 183, 187, 201
See application file for complete search history.

(56) References Cited

U.S. PATENT DOCUMENTS

| 4,468,766 | A | * | 8/1984 | Spezio | 359/326 |
| 5,926,496 | A | | 7/1999 | Ho et al. | 372/92 |
| 6,094,285 | A | | 7/2000 | Wickham et al. | 398/1 |
| 6,269,200 | B1 | * | 7/2001 | Wickham et al. | 385/15 |
| 6,580,851 | B1 | | 6/2003 | Vahala et al. | 385/30 |
| 6,901,224 | B1 | * | 5/2005 | Davis | 398/202 |
| 2003/0090767 | A1 | * | 5/2003 | Yap et al. | 359/181 |

* cited by examiner

*Primary Examiner*—John D. Lee
(74) *Attorney, Agent, or Firm*—Ladas & Parry LLP

(57) ABSTRACT

A data signal is modulated onto an optical carrier, sub-band channels are then removed therefrom by microresonators, and each data sub-band channel is then combined in a detector with a corresponding local oscillator optical signal removed by a microresonator from a frequency comb modulated onto another optical carrier.

32 Claims, 3 Drawing Sheets

METHOD AND APPARATUS FOR OPTICAL DIVISION OF A BROADBAND SIGNAL INTO A PLURALITY OF SUB-BAND CHANNELS

TECHNICAL FIELD

This disclosure relates to methods and systems for dividing a signal into a number of signals having narrower frequency bands. More particularly, the disclosure relates to optical methods and apparatuses for dividing a wide-band microwave signal into a large number of smaller frequency bands to enable, inter alia, simultaneous analysis of the entire frequency band with a large number of narrow-band signal processors.

BACKGROUND

There are many instances in which it may be desirable to analyze all the information contained in a very broadband signal, such as a microwave signal. Limitations on processing speed often dictate an approach that entails dividing the frequency band of the signal into a number of narrower frequency sub-band signals or channels (in a process sometimes referred to as channelizing), and processing the reduced amount of information in each of these narrower sub-bands. The processing speed acceptable for processing the information in each sub-band or channel decreases as the signal is divided into narrower sub-bands.

RF domain channelizing techniques are well known in the art and tend to require relatively bulky, highly power-consumptive equipment. Using currently available equipment and techniques, a microwave system for dividing a 50 GHz wide signal into one hundred 0.5 Ghz wide sub-bands would typically require tens of Watts of power and several cubic feet of volume. Existing optical techniques (e.g. Wavelength Division Multiplexing, or WDM) offer considerable savings in weight, size and power over microwave approaches, but are typically not adept at resolving frequency bands that are spaced less than many GHz apart and currently, the best commercially-available devices can separate frequencies that are a minimum of 50 GHz apart.

In WDM, optical signals are routed by discriminating between the wavelengths and information is impressed on an optical carrier signal (i.e. a light wave) by detecting and modulating the intensity (not amplitude) of the light wave (often referred to as Intensity Modulation Direct Detection, or IMDD). This approach is relatively easy to implement, but does not allow for efficient frequency routing because information that is impressed on the carrier signal by modulating the intensity of the carrier signal can be routed by wavelength only if all of the information impressed upon the carrier signal is routed with that wavelength. Thus, for example, conventional WDM technology (IMDD) may be applied to routing a series of wavelengths (i.e. sub-bands or channels) separated by 50 GHz and each carrying 10 GHz of information (i.e., the optical bandwidth of the carrier plus signal is approximately 20 GHz) but not to routing a carrier with 50 GHz of impressed information in 1 GHz channels. This is due to the fact that the optical sidebands produced by Intensity Modulation are not the same as those produced by Amplitude Modulation. For this reason, an optical sub-band of an Intensity-Modulated optical carrier signal would not, on Direct Detection, produce the information that was originally in the baseband-equivalent of that sub-band.

U.S. Pat. No. 6,094,285 discloses an optical RF channelizer system that employs Bragg diffraction gratings to spatially split an optical carrier signal into sub-bands, and can further employ Fabry-Perot filters tuned to specific sub-bands of the diffraction gratings. Because the system disclosed employs concatenated polarizing beam splitters, the light polarization must be accurately maintained throughout the system. These are relatively costly devices and are very difficult to implement at the microchip level with semiconductor devices. Fabry-Perot filters additionally require large cavities to achieve a high quality factor Q, and are thereby also difficult to implement at the microchip level. Furthermore, polarizing beam splitters are not very efficient, and typically suffer losses on the order of 1 dB or more, thereby limiting a system according to this patent to approximately 10 channels.

Other types of fiber-optic filters that are able to filter IMDD information correctly are currently available. These transversal or delay-line filters are relatively large for on-chip applications and furthermore are inherently inefficient because they are designed to discard out-of-band information rather than channel it to its proper destination.

What is needed is a method and apparatus for dividing a wide-band signal into a large number of smaller frequency bands that is power efficient, not vulnerable to acoustic noise effects, and amenable to on-chip implementation with semiconductor devices. The embodiments of the present disclosure answer these and other needs.

SUMMARY

In a first embodiment disclosed herein, a method comprises generating identical first and second optical signals, amplitude modulating an incoming data signal onto the first optical signal to generate a data optical signal, amplitude modulating a frequency comb having equal channel spacing onto the second optical signal to generate a plurality of local oscillator optical signals, passing the modulated optical signal through an optical waveguide optically coupled to each of N first optical resonators, each first optical resonator having a different predetermined resonant frequency corresponding to a different predetermined channel of the frequency comb to remove that channel from the data optical signal, passing the local oscillator optical signals through an optical waveguide optically coupled to each of N second optical resonators, each second optical resonator having a resonant frequency substantially equal to the resonant frequency of a corresponding first optical resonator to remove the corresponding local oscillator optical signal, and summing the channel and local oscillator optical signal removed by each corresponding pair of first and second optical resonators having equal resonant frequencies in a preselected one of N photodetectors to generate N sub-band data signals.

In another embodiment disclosed herein, a system comprises an optical source for generating identical first and second optical signals, a first modulator for amplitude modulating an incoming data signal onto the first optical signal to generate a data optical signal, a second modulator for amplitude modulating a frequency comb having equal channel spacing onto the second optical signal to generate a plurality of local oscillator optical signals, a first optical waveguide for passing the data optical signal therethrough, N first optical resonators optically coupled to the first optical waveguide, each first optical resonator having a different predetermined resonant frequency corresponding to a different predetermined channel of the frequency comb to remove that channel from the data optical signal passing through the first optical waveguide, a second optical waveguide for passing the local oscillator optical signals therethrough, N second optical resonators optically coupled to the second optical waveguide, each second optical resonator having a resonant frequency substantially equal to the resonant frequency of a corresponding first optical resonator to remove the corresponding local oscillator optical signal passing through the second optical waveguide, and N photodetectors, each photodetector configured for summing the channel and local oscillator optical signal removed by each corresponding pair of first and second optical resonators having equal resonant frequencies to generate N sub-band data signals.

In a further embodiment disclosed herein, the optical resonators may be microresonators such a microsphere resonators or microdisk resonators. In a still further embodiment, the amplitude modulator may be a Mach-Zehnder interferometric modulator. In another embodiment, the optical source may generate an optical signal and the first modulator may comprises a dual output interferometric modulator to generate the data optical signal as one output and to generate the second optical signal as the other output. In a different embodiment, the optical source may comprise an optical generator for generating an optical signal and an optical splitter for splitting the optical signal into the first and second optical signals.

These and other features and advantages will become further apparent from the detailed description and accompanying figures that follow. In the figures and description, numerals indicate the various features, like numerals referring to like features throughout both the drawings and the description.

DETAILED DESCRIPTION

Figure 1:
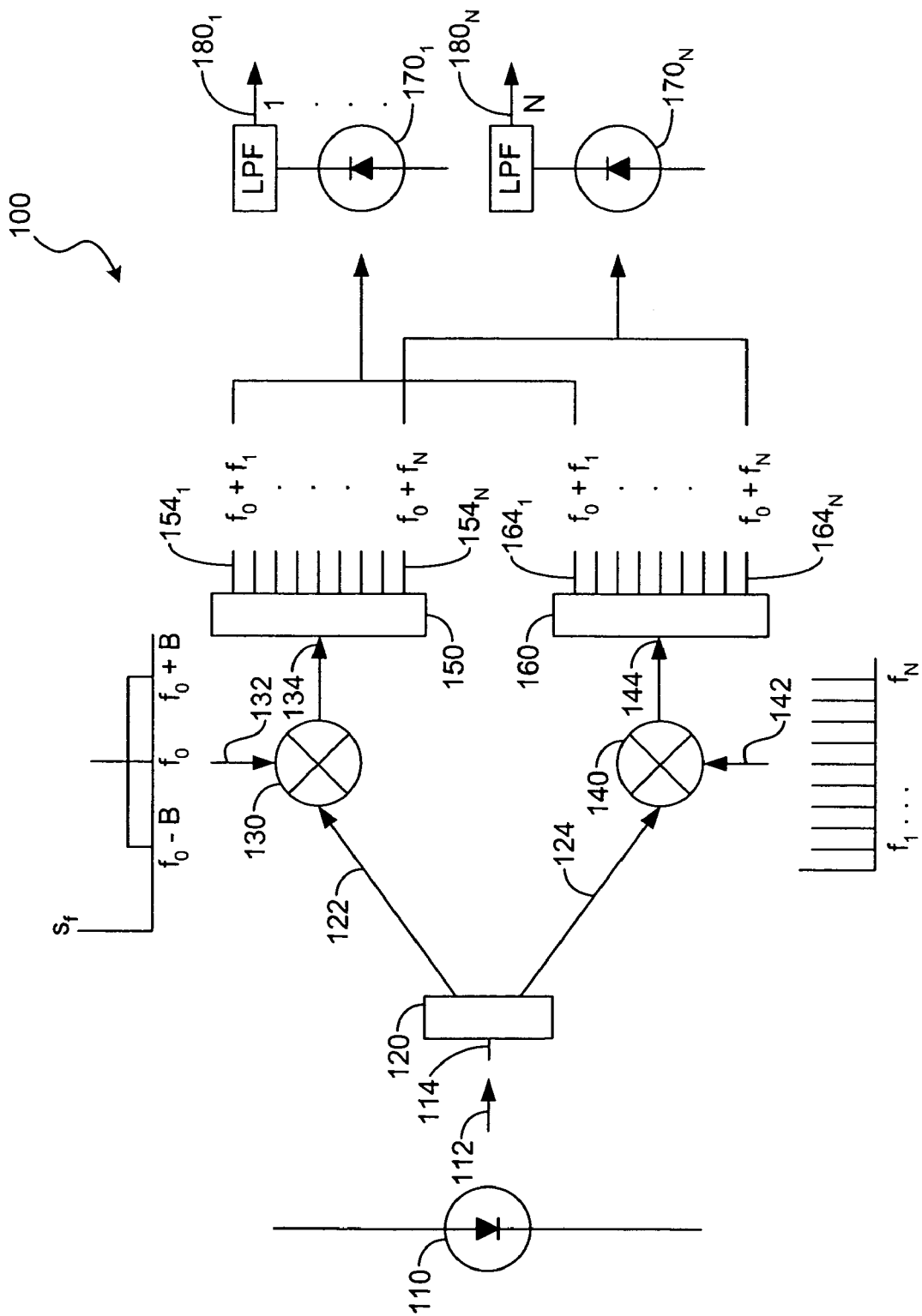
FIG. 1 is a functional diagram of a system as disclosed herein.

Referring to FIG. 1, in one embodiment a system 100 generally includes an optical source 110 such as a laser or a laser with an optical amplifier, that produces an optical carrier signal in the form of a light beam 112 and injects the light beam into an optical waveguide 114, which may be an optical fiber. The waveguide 114 is connected to optical splitter 120 which receives and splits the carrier signal 112 into two optical signals that are fed into two optical waveguides 122, 124.

One portion of the split optical carrier signal is passed by optical waveguide 122 to an optical amplitude modulator 130 that modulates a wideband information signal 132 (such as an RF or microwave signal) on the optical carrier signal to generate a data optical signal 134 carrying all of the information in the wideband signal. The other portion of the split optical carrier signal 112 is passed by optical waveguide 124 to another optical amplitude modulator 140 that modulates an equally-spaced frequency comb 142 onto the second optical carrier signal to generate a companion local oscillator signal 144. In one embodiment, modulator 130 and/or modulator 140 may be Mach-Zehnder interferometric modulators as known in the art and discussed elsewhere herein.

Routers 150 and 160 receive the data optical signal 134 and the local oscillator signal 144, respectively, and route predetermined sub-band channels $154_1 \ldots 154_N$, $164_1 \ldots 164_N$ in each optical signal 134, 144 by frequency to a series of detectors $170_1 \ldots 170_N$ which may be heterodyne or homodyne detectors and which generate a down-converted RF signal $180_1 \ldots 180_N$ having the desired baseband information.

With continued reference to FIG. 1, in one method of use of system 100, each data signal sub-band $154_1 \ldots 154_N$ routed by the frequency router 150 has a companion local oscillator signal sub-band $164_1 \ldots 164_N$ that may be offset slightly in frequency. Each data signal sub-band $154_1 \ldots 154_N$ and corresponding companion local oscillator signal sub-band $164_1 \ldots 164_N$ (i.e. the companion local oscillator signal sub-band that is in the same frequency band, or only slightly offset therefrom) are correctly routed so that they are added at the corresponding detector $170_1 \ldots 170_N$. Each detector $170_1 \ldots 170_N$ includes one or more photodetectors and is configured to square the added signals and generate a current signal $180_1 \ldots 180_N$ that is proportional to the product of the two sub-band signals $154_1 \ldots 154_N$, $164_1 \ldots 164_N$. For homodyne detection, this product term is the same as the baseband information in the respective narrow sub-band $154_1 \ldots 154_N$.

As will be appreciated, an advantage conferred by system 100 is that the homodyne or heterodyne signals have frequencies that are equal to the frequency of the optical data signal $154_1 \ldots 154_N$ minus the frequency of the companion local oscillator signal sub-band $164_1 \ldots 164_N$. Because both have been impressed upon the same carrier by external amplitude modulation, any frequency or phase shifts (i.e., FM or PM noise) in the source is automatically subtracted. For this reason, the recovered signal is associated exclusively with the narrow band of information and is not corrupted by FM or PM noise. System 100 therefore confers a significant noise advantage over systems that use a second laser source to generate the local oscillator optical signal.

Figure 2:
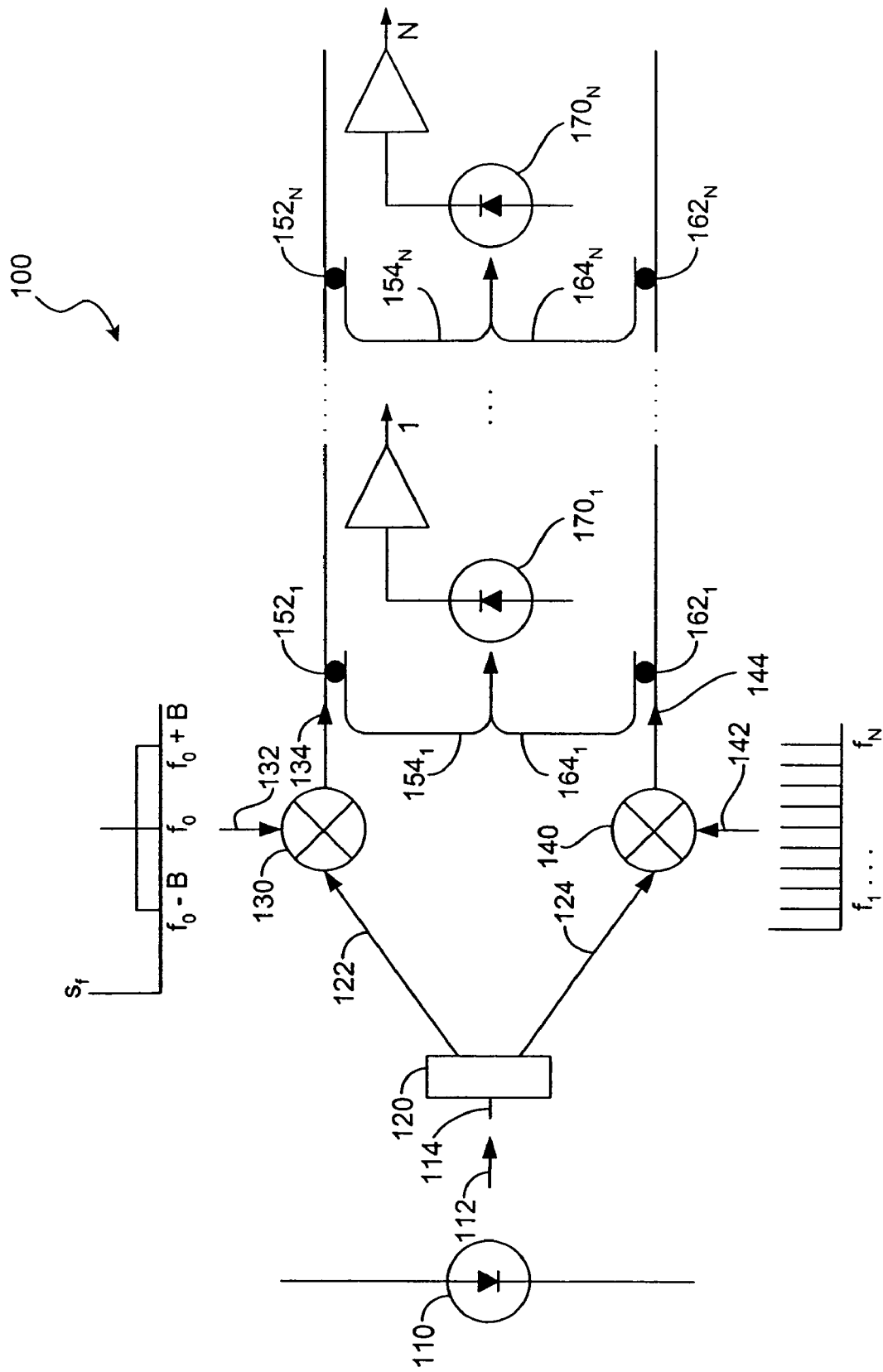
FIG. 2 illustrates one implementation of the system of FIG. 1.

With reference now to FIG. 2, in one embodiment of system 100, routers 150 and 160 are implemented through the use of microresonators $152_1 \ldots 152_N$ and $162_1 \ldots 162_N$, respectively. Microresonators $152_1 \ldots 152_N$ are arranged in series along, and optically coupled with, the optical waveguide that carries the data optical signal 134 generated by amplitude modulator 130. Each microresonator $152_1 \ldots 152_N$ is configured with a different resonant frequency corresponding to a different one of the desired sub-bands $154_1 \ldots 154_N$. As is well known, light propagating in the waveguide having a wavelength resonant with a microresonator $152_1 \ldots 152_N$ (i.e. having a frequency corresponding to the resonant frequency of the microresonator) will couple with the microresonator via resonant waveguide coupling and substantially all the energy in that sub-band of the light wave will be transferred into the particular microresonators output waveguide. Light that is outside of this narrow sub-band simply passes on to the next resonator. In this manner, the process may repeated until all the energy in the light wave of the data optical signal 134 has been transferred to the appropriate single channel receivers by the respective microresonators. Thus, in one embodiment, the N resonant frequency sub-bands of all microresonators $152_1 \ldots 152_N$ may be configured to divide the entire frequency spectrum of the data optical signal 134.

Microresonators are known in the art and typically include a microcavity. Further details may be found in, inter alia, U.S. Pat. No. 5,962,496 and U.S. Pat. No. 6,580,851, the disclosures of both of which are incorporated herein in their entirety by reference thereto. Any type of microresonator, including microdisk and microsphere resonators, are amenable to use with the embodiments disclosed herein.

With continued reference to FIG. 2, microresonators $162_1 \ldots 162_N$ are arranged in series along, and optically coupled with, the optical waveguide that carries the companion local oscillator signal 144 generated by amplitude modulator 140. In a manner similar to microresonators $152_1 \ldots 152_N$, each microresonator $162_1 \ldots 162_N$ is configured with a different resonant frequency corresponding to a different one of the desired sub-bands $164_1 \ldots 164_N$. Sub-bands $164_1 \ldots 164_N$ are identical to (or alternatively, slightly offset from) sub-bands $154_1 \ldots 154_N$ and thus each pair of microresonators $152_1$–$162_1 \ldots 152_N$–$162_N$ has identical (or nearly identical) resonant frequencies. Thus, each microresonator $162_1 \ldots 162_N$ selectively draws the light energy at its respective resonant frequency out of the companion local oscillator signal 144.

Each pair of microresonators $152_1$–$162_1 \ldots 152_N$–$162_N$ passes the energy it has absorbed from the data optical signal 134 and the companion local oscillator signal 144, respectively, to a respective detector $170_1 \ldots 170_N$ where, as previously discussed, each narrow band of information $154_1 \ldots 154_N$ is combined with its companion local oscillator sub-band $164_1 \ldots 164_N$, and the down-conversion of each respective narrow information sub-band signal is thereby effected.

Figure 3:
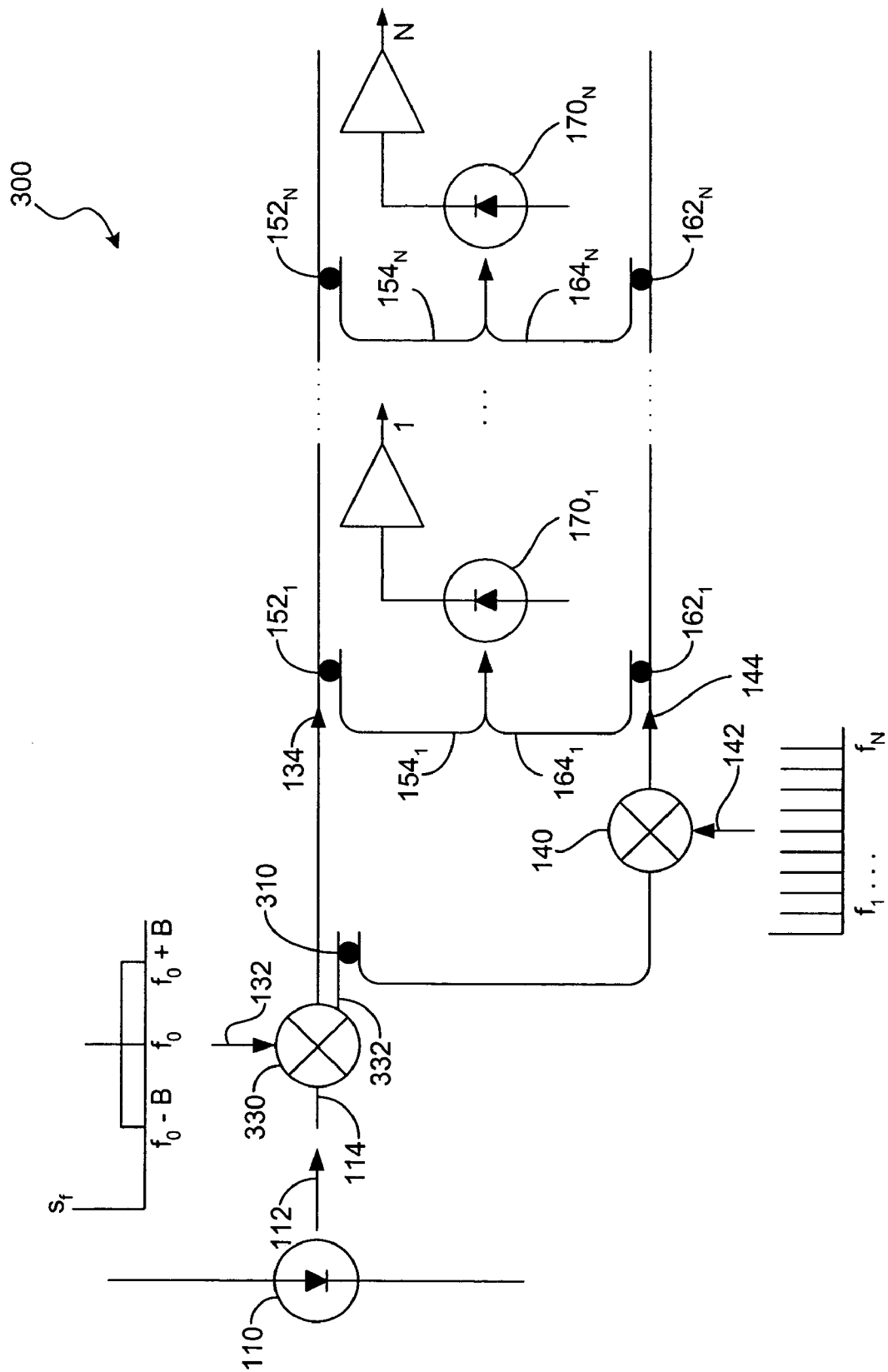
FIG. 3 illustrates another implementation of the system of FIG. 1.

With reference to FIG. 3, an alternative embodiment offers improved power usage in the form of system 300. System 300 is similar to system 100 as represented by FIG. 2, but does not utilize a splitter. Instead, light beam 112 is fed directly to amplitude modulator 330, which is a dual output port modulator. In one embodiment, modulator 330 may be a Mach-Zehnder dual output port interferometric modulator. As known in the art, Mach-Zehnder electro-optic modulators modulate the intensity of light based on interference of two optical paths. At least one optical path is designed to have an electro-optic material so that a control voltage can be applied to modify the refractive index of the electro-optic material and hence the total optical path length. An input optical signal is split into two optical signals that are respectively coupled into the two optical paths. The two optical signals undergo different optical path lengths and hence are delayed relative to each other. The two optical signals are then combined and interfere with each other to generate an output optical signal. Because amplitude modulation (AM) interferometric modulators such as Mach-Zehnder modulators are typically operated at pinch-off so as to achieve fully-suppressed carrier modulation, only a small fraction of the light energy is actually used to generate the modulated signal and the rest of the energy is dissipated. However, in a two-output AM modulator such as modulator 330 the balance of unused optical energy is output from the second output port 332.

Because the second port 332 will output both the unmodulated carrier signal 112 as well as some second harmonic, microresonator 310 is optically coupled to the second output port to tap off only the carrier signal 112. This "purified" carrier signal is then supplied to the microresonators $162_1 \ldots 162_N$ as previously detailed. This particular approach, wherein a large amount of power is incident on the modulator 330 but only a small amount comes out in the modulated signal 134, is known to give the best Spur Free Dynamic Range for analog systems. Thus, the use of a dual output port AM modulator confers two advantages: it efficiently uses all of the available optical power, and maximizes the Spur Free Dynamic Range of the system.

Microresonators $152_1 \ldots 152_N$ fulfill two functions within the operation of system 300—they tap out the optical energy at the correct sub-bandfrequency, and further also act to reject image frequencies that occur whenever a local oscillator signal of frequency $f_c$ is mixed with an AM signal. As is well known, upon mixing at a detector, the image tones below $f_c$ are folded over into the recovered baseband signal. Multiple approaches are known and available to removing such image frequencies. In one embodiment, such image frequencies can be removed by prefiltering through the use of the microresonators, as in the embodiments of systems 100 and 200, where the microresonators both route and prefilter the light.

Alternatively, an image rejection detection circuit may be utilized, as disclosed in "Analysis of optical amplifier noise in coherent optical communication systems with optical image rejection receivers", Jorgensen et al., Journal of Lightwave Technology, Vol. 10, No. 5, pp. 660–671 (1992), the entire contents of which is incorporated herein by reference thereto. This approach allows the use of microresonators $152_1 \ldots 152_N$ with a broader bandwidth to route the data optical signal 134, followed by an image rejection detector and final IF filter to execute the final filtering. This approach also allows the use of very specific filter shapes to set the bandwidth of the detected signals and thus may be preferable in applications that have very stringent out-of-band rejection requirements, but is also less energy-efficient because the frequencies sent to a particular detector overlap with the frequencies sent to several other detectors. Additionally, the physical dimensions of such a circuit will be somewhat larger because of its increased complexity.

The novel approaches of the embodiments disclosed herein rely on the use of high-Q microsphere and microdisk resonators that may be used to couple light from one optical fiber to another with port-to-port insertion losses of less than 0.1 dB at bandwidths ranging from several MHz to several GHz. The embodiments disclosed herein therefore ensure that virtually all of the information modulated onto the optical carrier is routed to the desired detectors even when very fine channel spacing (i.e. a large number of sub-band channels) is employed.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

What is claimed is:

1. A method, comprising:
    generating first and second optical signals;
    amplitude modulating an incoming data signal onto the first optical signal to generate a data optical signal;
    amplitude modulating a frequency comb having equal channel spacing onto the second optical signal to generate a plurality of local oscillator optical signals;
    passing the data optical signal through an optical waveguide optically coupled to each of N first optical resonators, each first optical resonator having a different predetermined resonant frequency corresponding to a different predetermined channel of the frequency comb to remove that channel from the data optical signal;
    passing the local oscillator optical signals through an optical waveguide optically coupled to each of N second optical resonators, each second optical resonator having a resonant frequency substantially equal to the resonant frequency of a corresponding first optical resonator to remove the corresponding local oscillator optical signal; and summing the channel and local oscillator optical signal removed by each corresponding pair of first and second optical resonators having equal resonant frequencies in a preselected one of N photodetectors to generate N sub-band data signals.

2. The method of claim 1, wherein the sum of the N sub-band data signals comprises the incoming data signal.

3. The method of claim 1, wherein each optical resonator comprises a microresonator.

4. The method of claim 3, wherein each microresonator is selected from the group consisting of microsphere resonators and microdisk resonators.

5. The method of claim 1, wherein amplitude modulating the incoming data signal comprises:

amplitude modulating the incoming data signal in a Mach-Zehnder interferometric modulator.

6. The method of claim 1, wherein generating the first and second optical signals comprises:

generating an optical signal; and splitting the optical signal into identical first and second optical signals.

7. The method of claim 6, wherein the sum of the N sub-band data signals comprises the incoming data signal.

8. The method of claim 6, wherein each optical resonator comprises a microresonator.

9. The method of claim 8, wherein each microresonator is selected from the group consisting of microsphere resonators and microdisk resonators.

10. The method of claim 6, wherein amplitude modulating the incoming data signal comprises:

amplitude modulating the incoming data signal in a dual-output port Mach-Zehnder interferometric modulator.

11. The method of claim 1, wherein generating the first and second optical signals comprises:

generating an optical signal; and amplitude modulating the incoming data signal onto the optical signal in a dual output interferometric modulator to generate the data optical signal as one output and to generate the second optical signal as the other output.

12. The method of claim 11, wherein generating the second optical signal further comprises:

passing the second optical signal through an optical waveguide optically coupled to an optical resonator having a resonant frequency equal to the carrier frequency of the generated optical signal to extract the second optical signal and reject any harmonic frequencies.

13. The method of claim 12, wherein the sum of the N sub-band data signals comprises the incoming data signal.

14. The method of claim 12, wherein each optical resonator comprises a microresonator.

15. The method of claim 14, wherein each microresonator is selected from the group consisting of microsphere resonators and microdisk resonators.

16. The method of claim 12, wherein amplitude modulating the incoming data signal comprises:

amplitude modulating the incoming data signal in a dual-output port Mach-Zehnder interferometric modulator.

17. A system, comprising:

an optical source for generating first and second optical signals;

a first modulator for amplitude modulating an incoming data signal onto the first optical signal to generate a data optical signal;

a second modulator for amplitude modulating a frequency comb having equal channel spacing onto the second optical signal to generate a plurality of local oscillator optical signals;

a first optical waveguide for passing the data optical signal therethrough;

N first optical resonators optically coupled to the first optical waveguide, each first optical resonator having a different predetermined resonant frequency corresponding to a different predetermined channel of the frequency comb to remove that channel from the data optical signal passing through the first optical waveguide;

a second optical waveguide for passing the local oscillator optical signals therethrough;

N second optical resonators optically coupled to the second optical waveguide, each second optical resonator having a resonant frequency substantially equal to the resonant frequency of a corresponding first optical resonator to remove the corresponding local oscillator optical signal from the local oscillator optical signals passing through the second optical waveguide; and N photodetectors, each photodetector configured for summing the channel and local oscillator optical signal removed by each corresponding pair of first and second optical resonators having equal resonant frequencies to generate N sub-band data signals.

18. The system of claim 17, wherein the sum of the N sub-band data signals comprises the incoming data signal.

19. The system of claim 17, wherein each optical resonator comprises a microresonator.

20. The system of claim 19, wherein each microresonator is selected from the group consisting of microsphere resonators and microdisk resonators.

21. The system of claim 17, wherein at least one of the first and second modulators comprises:

a Mach-Zehnder interferometric modulator.

22. The system of claim 17, wherein the optical source comprises:

an optical generator for generating an optical signal; and an optical splitter for splitting the optical signal into identical first and second optical signals.

23. The system of claim 22, wherein the sum of the N sub-band data signals comprises the incoming data signal.

24. The system of claim 22, wherein each optical resonator comprises a microresonator.

25. The system of claim 24, wherein each microresonator is selected from the group consisting of microsphere resonators and microdisk resonators.

26. The system of claim 22, wherein at least one of the first and second modulators comprises:

a Mach-Zehnder interferometric modulator.

27. The system of claim 17, wherein the optical source generates an optical signal having a predetermined carrier frequency and the first modulator comprises:

a dual output interferometric modulator to generate the data optical signal as one output and to generate the second optical signal as the other output.

28. The system of claim 27, further comprising:

a third optical waveguide for passing the second optical signal therethrough; and an optical resonator having a resonant frequency equal to the carrier frequency of the generated optical signal and optically coupled to the third optical waveguide to extract the second optical signal and reject any harmonic frequencies.

29. The system of claim 28, wherein the sum of the N sub-band data signals comprises the incoming data signal.

30. The system of claim 28, wherein each optical resonator comprises a microresonator.

31. The system of claim 30, wherein each microresonator is selected from the group consisting of microsphere resonators and microdisk resonators.

32. The system of claim 21, wherein the first modulator comprises:

a dual-output port Mach-Zehnder interferometric modulator.

* * * * *